US009884302B2

(12) United States Patent
Mairesse et al.

(10) Patent No.: US 9,884,302 B2
(45) Date of Patent: Feb. 6, 2018

(54) DISTRIBUTION OF SOLID PARTICLES IN A REACTOR

(71) Applicant: TOTAL RAFFINAGE CHIMIE, Courbevoie (FR)

(72) Inventors: Julien Mairesse, La Reole (FR); Guillaume Berric, Fontaine-la-Mallet (FR)

(73) Assignee: Total Raffinage Chimie, Courbevoie (FR)

( * ) Notice: Subject to any disclaimer, the term of this patent is extended or adjusted under 35 U.S.C. 154(b) by 109 days.

(21) Appl. No.: 14/405,181

(22) PCT Filed: Jun. 13, 2013

(86) PCT No.: PCT/FR2013/051387
§ 371 (c)(1),
(2) Date: Dec. 3, 2014

(87) PCT Pub. No.: WO2013/186497
PCT Pub. Date: Dec. 19, 2013

(65) Prior Publication Data
US 2015/0144223 A1    May 28, 2015

(30) Foreign Application Priority Data
Jun. 13, 2012  (FR) ...................................... 12 55523

(51) Int. Cl.
*B01J 8/00*    (2006.01)
(52) U.S. Cl.
CPC ............. *B01J 8/0015* (2013.01); *B01J 8/002* (2013.01); *B01J 8/003* (2013.01); *B01J 2208/00752* (2013.01); *Y10T 29/49826* (2015.01)

(58) Field of Classification Search
CPC  B01J 8/0015; B01J 8/003; B01J 2208/00752; B01J 8/002; Y10T 29/49826;
(Continued)

(56) References Cited

U.S. PATENT DOCUMENTS 1,566,493 A * 12/1925 McKay .................. B65G 69/00
                                                          198/530
3,064,833 A * 11/1962 Von Ruden ........... A01F 25/186
                                                          119/436
(Continued)

FOREIGN PATENT DOCUMENTS

CN        101861202 A      10/2010
CN        102245287 A      11/2011
(Continued)

OTHER PUBLICATIONS

International Search Report for PCT/FR2013/051387 dated Aug. 21, 2013 [PCT/ISA/210].
(Continued)

*Primary Examiner* — Jason K Niesz
*Assistant Examiner* — James Hakomaki
(74) *Attorney, Agent, or Firm* — Sughrue Mion, PLLC (57) ABSTRACT

The invention relates to a system (1) for distributing solid particles in order to load an enclosure with solid particles, including: a device (30) for supporting a device (10) for loading solid particles, said supporting device being arranged such as to maintain the loading device in the enclosure, and a sensor-supporting device (40), said sensor (46) intended for collecting information on the loading of the enclosure, and in which the system for distributing solid particles is arranged such that the supporting device and the sensor-supporting device can be mounted on the device for loading solid particles, while being movable relative to said loading device.

10 Claims, 5 Drawing Sheets

(58) Field of Classification Search
CPC ......... B25J 18/025; B25J 9/045; G01F 23/28;
G01F 23/284; G01F 23/296
USPC ............ 141/286, 340; 222/1, 181.1; 248/97;
414/301, 749.1; 74/89.2, 89.35;
342/124; 422/566, 119; 73/290 R,
73/290 V, 291; 702/45; 59/78
See application file for complete search history.

(56) References Cited

U.S. PATENT DOCUMENTS

| | | | | |
|---|---|---|---|---|
| 3,075,657 | A * | 1/1963 | Hazen | A01F 25/2009 |
| | | | | 119/57.5 |
| 3,151,750 | A * | 10/1964 | Nold | A01F 25/186 |
| | | | | 198/642 |
| 3,232,458 | A * | 2/1966 | Freeman | A01F 25/00 |
| | | | | 198/642 |
| 3,298,748 | A * | 1/1967 | Hultgren | A01F 25/186 |
| | | | | 406/162 |
| 3,350,043 | A * | 10/1967 | Apple | A47G 33/12 |
| | | | | 248/188.5 |
| 3,488,007 | A * | 1/1970 | Neuenschwander | B65G 69/00 |
| | | | | 239/687 |
| 3,804,273 | A * | 4/1974 | Uhl | B01J 8/0278 |
| | | | | 239/666 |
| 3,880,300 | A * | 4/1975 | Uhl | B01J 8/002 |
| | | | | 222/411 |
| 4,433,707 | A * | 2/1984 | Farnham | B01J 8/003 |
| | | | | 141/1 |
| 4,564,328 | A * | 1/1986 | Loutaty | B65G 69/0458 |
| | | | | 239/654 |
| 5,372,467 | A * | 12/1994 | Harris | B65G 69/0458 |
| | | | | 239/681 |
| 5,492,301 | A * | 2/1996 | Hauser | A47G 33/1226 |
| | | | | 248/188.4 |
| 5,533,392 | A * | 7/1996 | Kira | G01F 23/0023 |
| | | | | 33/720 |
| 5,731,994 | A * | 3/1998 | Okubo | B01J 8/003 |
| | | | | 141/1 |
| 5,753,585 | A | 5/1998 | Minami | |
| 6,672,155 | B2 * | 1/2004 | Muller | G01F 23/284 |
| | | | | 342/124 |
| 7,434,601 | B2 * | 10/2008 | Kraus | B01J 8/0025 |
| | | | | 134/169 C |
| 2005/0229482 | A1 * | 10/2005 | Wynn | A47G 33/12 |
| | | | | 47/40.5 |
| 2007/0012113 | A1 * | 1/2007 | Ulmer | G01F 23/2962 |
| | | | | 73/618 |
| 2007/0084283 | A1 * | 4/2007 | Carlson | G01F 1/007 |
| | | | | 73/290 V |
| 2009/0124444 | A1 * | 5/2009 | Soerensen | F16G 13/20 |
| | | | | 474/206 |
| 2010/0019952 | A1 | 1/2010 | Poussin | |
| 2010/0256803 | A1 | 10/2010 | Cottard et al. | |
| 2011/0184668 | A1 * | 7/2011 | Juchniewicz | B65D 88/16 |
| | | | | 702/45 |
| 2011/0253249 | A1 | 10/2011 | Cottard et al. | |
| 2011/0277421 | A1 | 11/2011 | Te Raa et al. | |
| 2012/0024091 | A1 * | 2/2012 | Kawabuchi | B25J 9/045 |
| | | | | 74/37 |
| 2012/0205007 | A1 | 8/2012 | Girard et al. | |
| 2015/0010444 | A1 * | 1/2015 | Mairesse | G01F 23/284 |
| | | | | 422/566 |

FOREIGN PATENT DOCUMENTS

| | | | |
|---|---|---|---|
| CN | 102264463 A | 11/2011 | |
| FR | 2 923 816 A1 | 5/2009 | |
| FR | 2 949 755 A1 | 3/2011 | |
| JP | 58171626 A * | 10/1983 | ............ G01F 23/28 |
| JP | 07-060104 A | 3/1995 | |
| WO | 2008/047050 A1 | 4/2008 | |

OTHER PUBLICATIONS

Search Report dated Dec. 4, 2015 from the State Intellectual Property Office of the P.R.C. issued in Chinese Application No. 201380031519.X.

* cited by examiner

DISTRIBUTION OF SOLID PARTICLES IN A REACTOR

CROSS REFERENCE TO RELATED APPLICATIONS

This application is a National Stage of International Application No. PCT/FR2013/051387, filed on Jun. 13, 2013, which claims priority from French Patent Application No. 12 55523, filed on Jun. 13, 2012, the contents of all of which are incorporated herein by reference in their entirety.

The invention relates to the distribution of solid particles in a chamber and in particular in a reactor.

It is known to charge reactors, in particular of the chemical, electrochemical, petroleum or petrochemical type, with solid particles in the divided state. These particles may, for example, be in the form of balls, grains, cylinders, pellets, rods or in any other form and generally have relatively small dimensions.

The particles may in particular be grains of solid catalysts which are generally extruded and produced either in a regular form or in the form of mono-shank or multi-shank rods whose dimensions may vary on a case by case basis by a few tenths of a millimeter to a few centimeters.

It is this use, known as "dense charging", of catalyst grains in a chemical reactor to which reference will be made more specifically in the remainder of the present description. However, the device described may more generally be used in the context of a charging operation of solid particles in a reactor or another cylindrical chamber.

The term "dense charging" is intended to refer to a charging operation which is carried out by means of rain effect which is optimized in order to allow a maximum of solid particles to be charged into a minimum space and in a minimum time in the most homogeneous and uniform manner possible.

Document WO 2010/076522 (Cottard et al.) describes an example of a distribution device for solid particles in a chamber.

This distribution device is installed in a filling opening of the reactor located at the top of the reactor and at the center of the reactor.

In order to measure the level of solid particles which have already fallen into the reactor, it is possible to arrange one or more probes (or sensors) for measuring inside the reactor, in particular during the filling operation. More generally, probes are installed inside the reactor in order to measure parameters relating to the monitoring of the charging of the solid particles in the chamber.

The installation of such a distribution system in the reactor, including in particular the distribution device and the probe supports, can nonetheless be relatively complex to carry out. One of the main restrictions with which the operators of this type of equipment may be confronted is connected with the inner spatial requirement, which is sometimes extreme, of a reactor which may contain plates, thermocouples and supports for these elements. This restriction is therefore connected with the small space available for the operators to maneuver the distribution device with a view to the installation and adjustment operations thereof.

There is a need for greater flexibility in the positioning of the solid particle distribution system in a chamber.

There is proposed a solid particle distribution system for charging a chamber, for example, a reactor, with solid particles. This system comprises:

- a retention device for a charging device for solid particles, this retention device being arranged so as to ensure the retention of the charging device in the chamber,
- a sensor support device, this sensor being intended to acquire information relating to the charging of the chamber.

The solid particle distribution system is arranged so that the retention device and the sensor support device can be mounted on the solid particle charging device whilst being able to be moved relative to this charging device.

In this manner, such a freedom of positioning of the sensor support device and the retention device may allow at least partial freedom from the restrictions which are connected with the environment in the reactor and which are in particular connected with the spatial requirement of the internal arrangements of the reactor, in terms of thermocouples or the like.

Such an arrangement may enable the duration of the installation of this solid particle distribution system in the reactor to be reduced. This may be particularly advantageous for an industrial application, for example, in a refinery, since reducing the stoppage time of a unit which must be charged or recharged with catalyst may enable considerable savings.

Furthermore, owing to this ease of positioning relative to the device for charging with solid particles, this arrangement may be more readily adapted to the environment than in the prior art. Furthermore, the reliability of the installation may thereby be increased since the distribution device, once placed in position, is retained in a fixed state in the reactor in a more secure manner.

This possibility of moving the sensor support device may further enable the position of the sensor(s) to be adjusted in accordance with the data to be acquired. For example, for a reactor with a large diameter, it is possible to radially offset the sensor more than for a reactor with a smaller diameter.

The retention device and/or the sensor support device may be mounted directly on the charging device, or indirectly, that is to say, via one or more other components.

Generally, in the present application, the term "on" is intended to be understood to mean both "directly on" and "indirectly on".

The retention device and/or the sensor support device may be removable, that is to say that the connection between one and/or other of these devices and the charging device may be readily disengaged by an operator, in order to enable removal whilst the charging device is still in the reactor, or non-removable, that is to say, this connection cannot be disengaged or the disengagement of this connection involves an unlocking operation.

The invention is in no way limited either by the type or by the direction(s) of the permitted movement(s). It is, for example, possible to provide a solid particle distribution system which is arranged so as to enable:

- the vertical movements, that is to say, along a longitudinal axis of the charging system, this longitudinal axis being parallel or substantially parallel with the direction of the gravity vector when the system is installed in a reactor,
- the rotation movements about this longitudinal axis,
- the radial movements relative to this longitudinal axis and/or
- other movements, of the sensor support device and/or the retention device relative to the charging device.

The invention is further not limited by the manner in which the retention device and the sensor support device are mounted on the charging device.

The distribution system may, for example, comprise pincers which are fixedly joined to the charging device, the sensor support device and/or the retention device in order to fix the retention device and/or the sensor support device to the charging device.

Alternatively, it is also possible to provide clip-fitting means, rail systems in the form of a dovetail, or the like.

Advantageously, and in a non-limiting manner, the distribution system may comprise a support element which is fixedly joined to the charging device. The distribution system may be arranged so that this support element is capable of supporting the sensor support device and/or the retention device whilst permitting the relative movement(s) of this sensor support device and/or this retention device relative to this support element.

This support element, which is fixedly joined to the charging device, may be sufficiently compact not to impede the introduction of the charging device in the reactor. For example, the thickness in a radial direction of this support element may be less than 10 centimeters, advantageously less than 5 centimeters, advantageously close to 3 or 4 centimeters.

Advantageously, and in a non-limiting manner, the permitted movements of the sensor support device and/or the retention device can be continued relative to the support element.

Advantageously, and in a non-limiting manner, the sensor support device and/or the retention device may form a slideway connection with the support element.

The movements during installation of the system may thus be relatively easy for an operator to carry out.

For example, the support element may form a rail on which the sensor support device and/or the retention device may slide.

Alternatively, it would be possible to provide another type of non-rigid connection, for example, a ball and socket connection, an annular connection or the like.

The support element may be integral with the charging device or may have been fixed to this charging device, for example, using screws or another method.

The invention is in no way limited by the manner in which the support element is fixedly joined to the charging device.

For example, the support element may comprise a ring of round form, for example, circular, which is fixedly joined to the charging device and which is arranged so as to support the retention device and/or the sensor support device so that this retention device and/or sensor support device can slide on this circular ring, and therefore around the charging device.

It is possible to provide a plurality of support elements, for example, a circular ring in order to support the sensor support device and another circular ring in order to support the retention device. Advantageously, however, a single circular ring will be provided, for the purposes of simplicity and lightness.

Advantageously and in a non-limiting manner, the solid particle distribution system may comprise one (or more) fixing plate(s) which is/are fixedly joined to the retention device or to the sensor support device. This fixing plate which is mounted so as to slide on the support element constitutes to some degree an element for adapting the retention device or sensor support device to the support element.

Advantageously, and in a non-limiting manner, the solid particle distribution system may comprise means for adjusting the height of the sensor support device and/or means for adjusting the height of the retention device.

An adjustment of the height of the sensor support device may allow the height of the sensor to be adjusted, in order in particular to be better adapted to the anticipated or measured charging profile.

An adjustment of the height of the retention device may allow the vertical position of the distribution system to be adjusted, and in particular enable adaptation to various thicknesses of a plate which is internal with respect to the reactor.

Advantageously, and in a non-limiting manner, the system may comprise means for adjusting the inclination. Advantageously, these means for adjusting the inclination may be arranged so as to modify the height of at least a portion of the retention device. It is, for example, possible to provide arms which have at the ends thereof means for being placed on a support, for example, swivel type feet, these means being adjustable in terms of height, for example, using a threaded rod or other means.

Such an adjustment of the inclination may in particular allow the horizontality of the distribution system to be adjusted after installation in the reactor.

Advantageously, and in a non-limiting manner, the solid particle distribution system may further comprise an angle measuring device, for example, a bubble type level sensor. Such an angle measuring device may assist in positioning the charging device in the reactor.

Advantageously, and in a non-limiting manner, the sensor support device and/or the retention device may be fixed to the support element in a non-removable manner. That is to say, this fixing prevents the removal of the sensor support device and/or retention device by means of simple traction of these devices.

Advantageously, and in a non-limiting manner, the solid particle distribution system may comprise locking means in order to ensure the fixing of the sensor support device and/or the retention device to the support element. It is possible, for example, to provide a closure member which is capable of pivoting about an axis or sliding in the longitudinal direction, for example, in order to be able to lock the sensor support device (or the retention device, respectively) around the support element.

The sensor support device and/or the retention device may be fixed to the support element in a removable manner. It is possible, for example, to make provision for one and/or the other of these devices to be placed on the support element and the removal of this device from the support element to be allowed by means of simple gripping and traction.

Advantageously, and in a non-limiting manner, the retention device may comprise retention means which are intended to cooperate with the environment, for example, pincers, swivel type feet, or other means.

The retention device may be arranged so that these retention means are laterally offset with respect to the charging device.

For example, the retention means may be remote from the charging device by several tens of centimeters, even several meters.

Advantageously, and in a non-limiting manner, the retention device may comprise a rod. This rod may be mounted at one end on the charging device whilst the other end is fixedly joined to the retention means, for example, to a swivel type foot.

This rod may advantageously comprise a plurality of portions which are capable of sliding relative to each other, for example, two portions which are capable of sliding one in the other. The length of the rod may thus be adjustable.

Advantageously, and in a non-limiting manner, the sensor support device may be arranged so that the sensor is laterally offset with respect to the charging device. For example, the sensor(s) may be remote from the charging device by several tens of centimeters, even several meters.

The system may therefore comprise spacer elements, for example, rods, arms, a drive chain or other means, which extend between two ends, one of these ends being mounted on the charging device and the other of these ends being fixedly joined to a retention means or to one or more sensors. The movable character of these spacer elements may allow ease of installation, retention and quality of data measured to be reconciled.

Advantageously, and in a non-limiting manner, the sensor support device may comprise an element for guiding a drive chain. This guiding element may be shaped to guide this chain in terms of rotation, for example, in order to apply an angle close to 90° or another angle to the drive chain.

The term "close to 90°" is intended to be understood to be between 45° and 135°, advantageously between 70° and 110°, advantageously between 80° and 100°, advantageously between 89° and 91°. The angle may, of course, be 90°.

The system for distributing solid particles may advantageously further comprise the charging device.

The distribution system may comprise one or more retention devices, and one or more sensor support devices.

There is further proposed a sensor support device for a solid particle distribution system in a chamber, this sensor being intended to acquire information relating to the charging of the chamber. This sensor support device comprises an element for guiding a drive chain, this chain being intended to support the sensor, this guiding element being shaped to guide the drive chain so that a portion of the chain at an output of this guiding element extends (along the length) in a different direction to that of a portion of the chain at the input of the guiding element.

In this manner, it is possible to introduce the chain, in an input of the guiding element, with a movement in a first direction, and, at the output of the guiding element, the chain has a movement in a second direction which is not parallel with the first direction and which is, for example, perpendicular to the first direction. The guiding element may thus be generally elbow-shaped.

The first direction may, for example, be close to the direction of the gravity vector whilst the second direction may be close to a radial direction. The sensor, which has been placed, for example, close to an end of the guiding chain, may thus be offset laterally whilst the chain is introduced in accordance with a movement close to the vertical.

There is further proposed a method for installing a solid particle distribution system in a chamber, for example, a reactor, this solid particle distribution system comprising a retention device which is arranged to ensure the retention of a charging device in the chamber, and a sensor support device, this sensor being intended to acquire information relating to the charging of the chamber. The method comprises a step of assembling the sensor support device and the retention device on the charging device and a step of adjustment during which the sensor support device and the retention device are moved relative to the charging device in order to be adapted to the environment inside the chamber, for example, the environment of the reactor and/or the anticipated shape of the charging profile of the reactor. In particular, it is possible to provide a movement in accordance with the diameter of the reactor.

In the present application, the terms "top", "bottom", "upper", "lower", "vertical", "horizontal", "lateral", "above", "below", etcetera, are defined with the conventional meaning of these terms (that is to say, the vertical direction and the direction of the gravity vector, this gravity vector being orientated from the top to the bottom), for a distribution system which is placed under normal conditions of use, that is to say, with the longitudinal axis thereof orientated in the direction of the gravity vector. Of course, the system is capable of being orientated differently, in particular during transport thereof.

The invention will be better understood with reference to the figures, which illustrate non-limiting embodiments.

Identical reference numerals can be used to refer to elements which are identical or similar from one figure to another.

Figure 1:
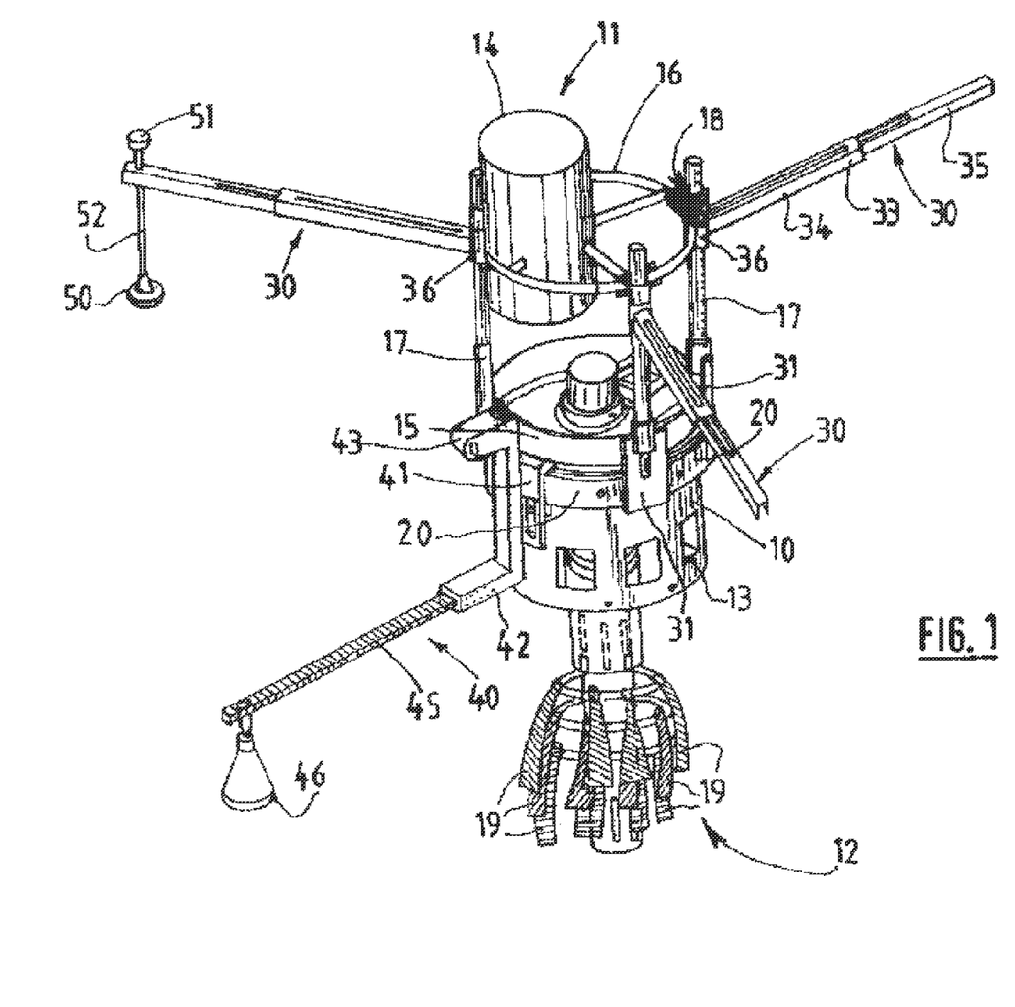
FIG. 1 is a perspective view of an example of a solid particle distribution system according to an embodiment of the invention.

With reference to FIG. 1, a solid particle distribution system 1 comprises a charging device 10 which is shaped to introduce solid particles, for example, balls, of extrudates of a catalyst which are not illustrated, or the like, into a reactor which is not illustrated. This charging device 10 defines a passage for the circulation of solid particles, from an input 11 to an output 12.

In this embodiment, blades 19 which are, for example, in the form of straps which are arranged at the output of the charging device 10 allow the solid particles to be better distributed in the reactor.

The charging device 10 comprises a main body 13, or shaft, of metal, and a feeder 14 which is intended to supply the charging device with solid particles (not illustrated). This feeder 14 comprises a lower metal ring 15, and an upper metal ring 16. This upper ring 16 is fixed to a support ring 18 which is mounted on metal foot extensions 17 which are generally in the form of a hollow tube.

A support element, in this instance in the form of a circular metal ring 20, is mounted on the charging device 10. This ring 20 is fixedly joined to the charging device 10 by means of screwing via holes (designated 28 in FIG. 2B).

Figure 2A:
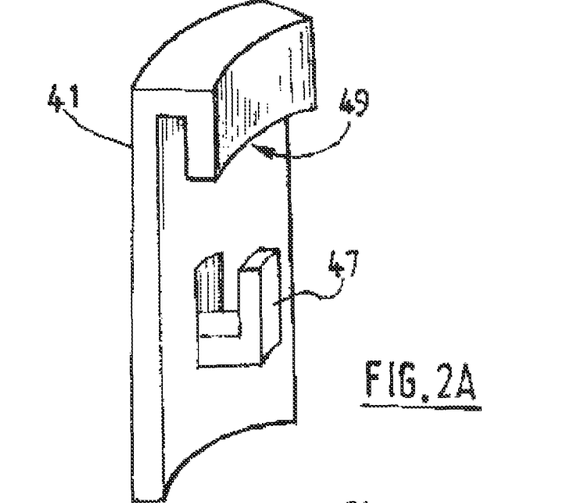
FIG. 2A is a perspective view of a plate of an example of a sensor support device which is mounted on a support element, for a distribution system according to an embodiment of the invention.
Figure 2B:
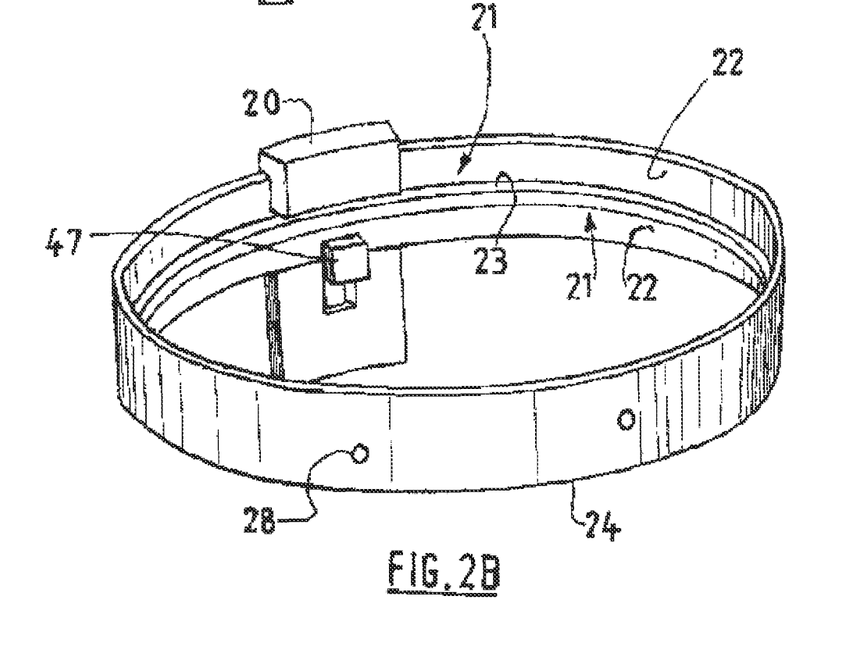
FIG. 2B is another perspective view of this plate, mounted on a support element.

As shown in detail in FIG. 2B, the circular ring 20 has such a shape that, when this ring 20 is fixed to a generally cylindrical device, recesses 21 are defined between inner surfaces 22 of the ring 20 and the cylinder.

This is because the circular ring 20 comprises a protrusion 23 which has a square or rectangular cross section and which is intended to be in contact with the outer surface of the charging device which is generally in the form of a cylinder.

Fixing elements may be introduced into these recesses 21, in order to allow retention devices for the distribution system to be fixed in the reactor and sensor support devices to be fixed, these sensors allowing information to be acquired during the charging of the reactor.

To return to FIG. 1, the distribution system comprises three retention devices 30 which are mounted on the circular ring 20. Each of these retention devices comprises a fixing plate 31 which is mounted on the circular ring and which supports a foot extension 17.

There is fixed to this foot extension 17 a fixing arm 33 which is produced from metal. This fixing arm 33 comprises a sliding member 34 and a sliding member extension 35 which is capable of sliding inside the sliding member 34.

In this example, the retention device comprises at the end of the sliding member 34 a guiding ring 36 which is capable of being mounted on the foot extension tube 17. A hole (designated 38 in FIG. 3) extends through this guiding ring for locking in terms of height.

In this manner, the arm 33 can be inserted onto the foot extension 17. There extend through this foot extension 17 holes (designated 32 in FIG. 3) which are regularly spaced apart from each other so that the adjustment in terms of height of each arm 33 may be carried out using a pin which is not illustrated.

Figure 3:
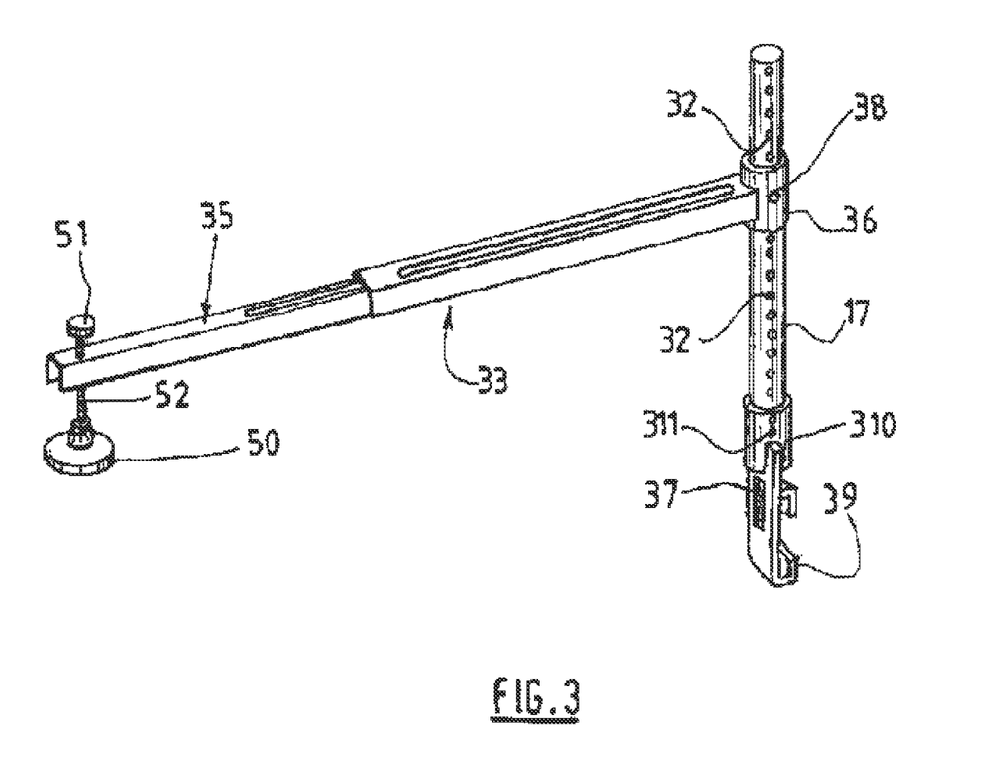
FIG. 3 is a perspective view of an example of a retention device, for a distribution system according to an embodiment of the invention.

FIG. 3 shows in a more detailed manner one of the retention devices. The fixing plate 31 thereof has a U-shaped cross section in the lower portion 39 thereof, the branch of the U which has a free end being able to be received in the recess 21 of the circular ring 20.

After this plate 31 has been installed so that a lower edge (designated 24 in FIG. 2B) of the circular ring 20 is received inside this U-shaped portion 39, a closure member 37 is lowered in order to lock the plate 31 around the circular ring 20. In this manner, the plate 31 can slide along the circular ring 20 with a rotation movement about a longitudinal axis. The plate 21 locally defines a slideway connection with the ring 20. Since this ring 20 is circular, the plate has a rotation movement about the charging device 10 when it is moved.

To return to FIG. 1, the distribution system further comprises three sensor support devices 40, only one of which is illustrated in FIG. 1 in order not to overload the figure.

It is possible to provide more sensor support devices, for example, five, or fewer sensor support devices, for example, only one. Generally, in the present application, "one" is intended to be understood to mean "one or more".

Each sensor support device comprises a corresponding fixing plate 41, of the same type as the plates 31 of the retention devices 30. The plates 31, 41 are produced from metal.

As illustrated in FIG. 2A, the fixing plates 41 of the sensor support devices 40 are arranged with one or more closure member(s) 47 located in the lower portion thereof, so that, in order to fix these plates 41 to the ring 20, these members 47 are raised by means of a vertical sliding movement. Blocking means which are not illustrated, of the screw or cam type, for example, prevent the member 47 from falling as a result of gravitational force.

The plates 31, 41 thus each comprise a U-shaped portion 39, 49 and, opposite this U-shaped portion 39, 49, one or more closure member(s) 37, 47 which is/are mounted so as to slide on the plate 31, 41 in order to be able to approach the U-shaped portion 39, 49.

Figure 4A:
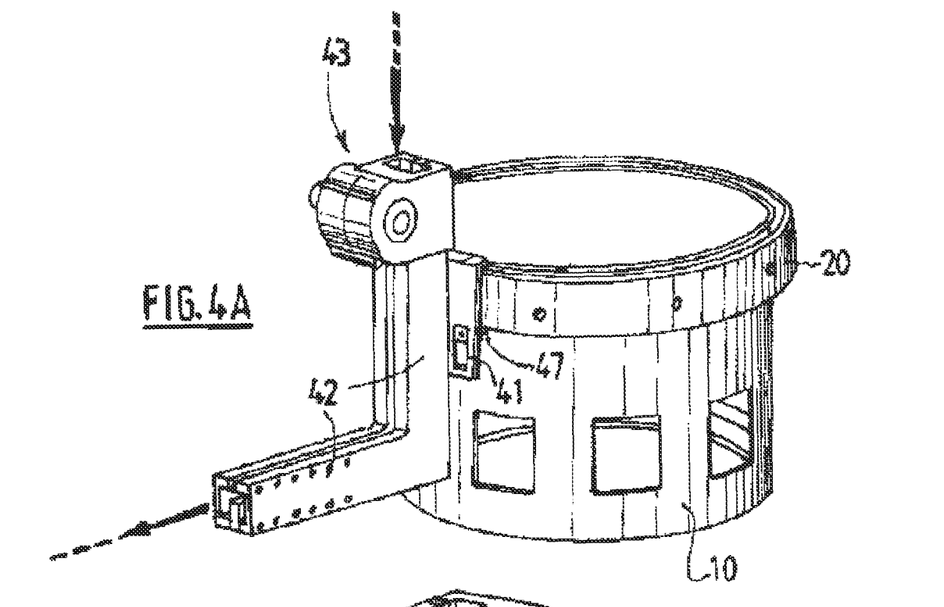
FIG. 4A is a perspective view of a guiding assembly and a plate of a sensor support device, of a support element, and a shaft of a distribution system according to an embodiment of the invention.
Figure 4B:
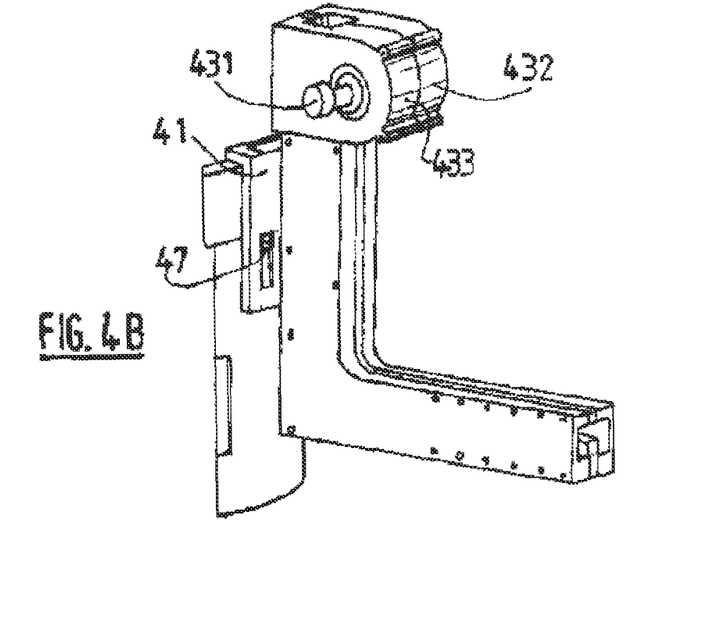
FIG. 4B is another (partial) view of the assembly of FIG. 4A.

With reference to FIGS. 4A and 4B, the plate 41 illustrated in these figures comprises two members which are arranged at one side and the other of a guiding element which is generally elbow-shaped.

The sensor support device 40 thus comprises a guiding element 42 which is mounted on the plate 41 and a drive assembly 43.

The guiding element may receive a drive chain (designated 45 in FIG. 1) at the end of which a sensor can be fixed (designated 46 in FIG. 1).

The drive chain is introduced into the passage of the guiding element 42 with a substantially vertical movement (in accordance with the arrow), and exits with a substantially radial movement (in accordance with the arrow).

The drive assembly 43 is arranged so as to be able to drive the chain via the guiding assembly 42.

The guiding assembly 42 is mounted on a corresponding fixing plate 41. More specifically, the guiding assembly is fixedly joined to the fixing plate by means of screwing via holes (designated 425, 425' in FIG. 5) of this assembly 42.

Figure 5:
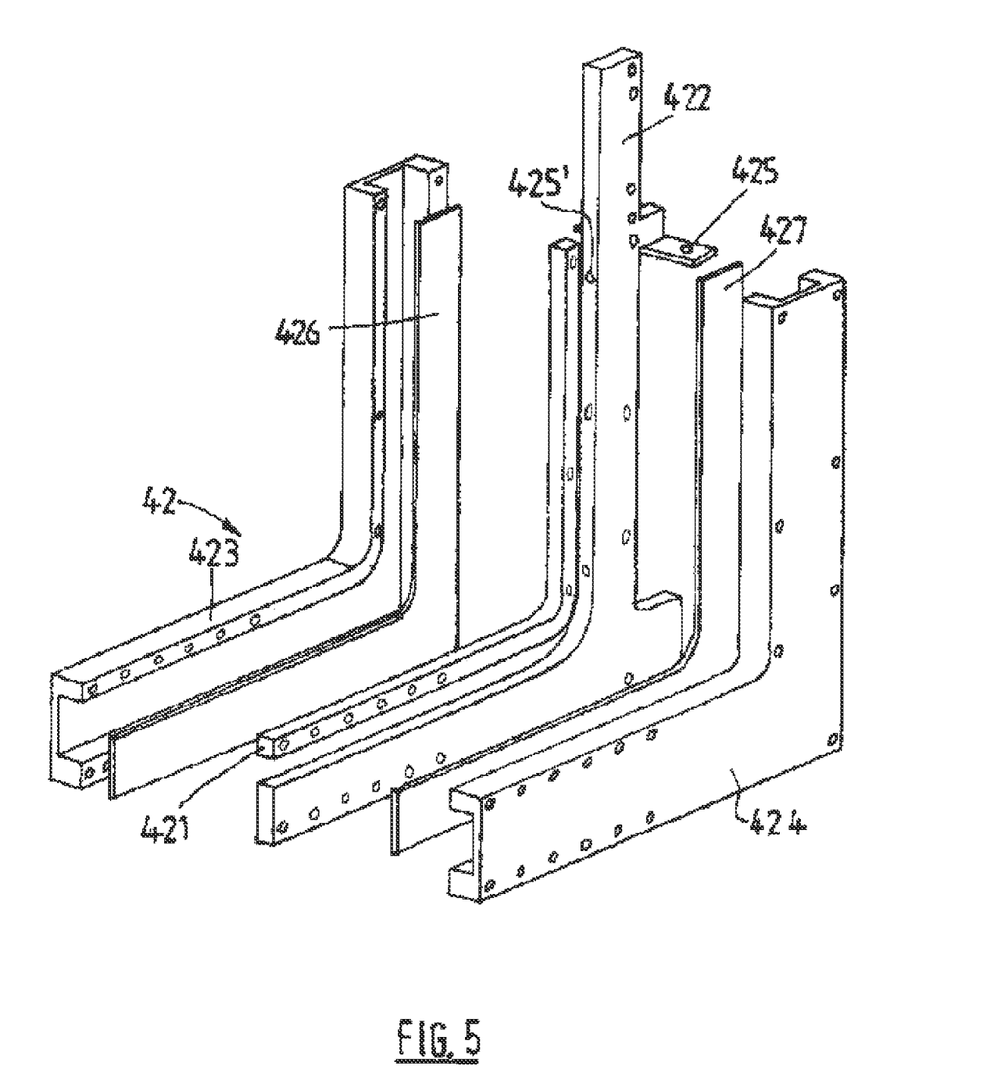
FIG. 5 is an exploded view of a guiding assembly for a distribution system according to an embodiment of the invention.

With reference to FIG. 5, the guiding assembly is obtained by assembling two guides 421, 422 which are produced from metal. This assembly is arranged to support and guide the drive chain. This drive chain may be produced from metal.

The guiding assembly comprises an upper guide rail 421, a lower guide rail 422, two metal guiding housings 423, 424 and two Teflon flanges 426, 427.

The two rails 421, 422 allow rollers of the links of the drive chain to be guided.

The two housings 423, 424 laterally close the guiding assembly and ensure the strength of the assembly. These housings 423, 424 ensure with the Teflon flanges 426, 427 the lateral retention of the chain and prevent the swivel action which can bring about jamming of this chain.

The guiding assembly is generally L-shaped, in order to be able to convert a vertical translation movement of the drive chain into a horizontal translation movement, in order to adjust the distance of the sensors with respect to the charging device.

The horizontal portion of the guiding assembly or the base of the L is configured so as to be able to adjust the length thereof by means of sectioning, without affecting the structure thereof.

In order to return to FIGS. 4A, 4B and 5 (for the reference numeral 421), the drive assembly 43 which is fixedly joined to the lower rail 422 of the guiding assembly 42 by means of screwing comprises a drive pinion which cannot be seen in the figures, two cross-members which cannot be seen in the figures and two rollers which cannot be seen in the figures, two housings 432, 433 and a drive shaft 431.

The two rollers with an integrated stop are arranged at one side and the other of the drive shaft, each roller being spaced apart from this pinion as a result of the corresponding cross-member.

This assembly can be activated, for example, using a tool of the socket wrench type or crank.

As a result of the use of a drive chain and the corresponding guiding, the sensor support, whose spatial requirement is considerably reduced when the chain is in the vertical position, parallel with the longitudinal axis of the reactor, can be installed in a manner involving relatively little restriction, which may be particularly advantageous when the environment instead involves specific restrictions in terms of spatial requirement and/or lack of space.

An example of a method for installing a particle distribution system according to an embodiment of the invention will now be described.

Initially, the circular ring 20 is fixedly joined to the shaft 10 of the charging device by means of screwing. Then, the assembly comprising the shaft and ring is lowered into the reactor, via an opening in the upper portion of the reactor.

Secondly, operators bring the fixing plates 31, 41 of the retention devices 30 and sensor support devices 40. These plates are fixed to the ring 20 so as to enable sliding along the ring 20. Such a rail system allows relatively easy manipulation operations for operators seeking to position the plates 31, 41.

In an embodiment, it would be possible to make provision for these plates 31, 41 to be fixed before lowering the charging device into the reactor.

The foot extensions 17 are then installed on the fixing plates 31. This is because, with reference to FIG. 3, each plate 31 defines a receptacle 310, which is integral with the body of the plate 31, in order to receive a lower end of a corresponding foot extension 17. This receptacle 210 defines a hole 311 for the locking using a pin (not illustrated) of the foot extension 17 on the plate 31.

The arms 33 are then mounted on these foot extensions 17. The operator is able to adjust the angular movements of these arms by moving the corresponding plates along the rails of the circular ring 20. Furthermore, it is possible to modify the height of these arms 33 by moving the guiding rings 36 along the foot extensions 17.

These arms 33 may comprise, at the end thereof opposite the end which is fixed to the foot extensions 17, fixing means with respect to the reactor, for example, swivel type feet 50 which are intended to be placed on a plate of the reactor.

The operators can thus adjust the height and the orientation of these arms 33 in order to best install the charging device 10.

Furthermore, the length of these arms 33 can be adjusted by sliding the components 34, 35 one in the other. Locking cams which are not illustrated allow the sliding member extension 35 to be locked relative to the sliding member 34.

The charging system may further comprise a level sensor which is not illustrated and which may provide measurements with regard to the orientation of the charging device 10 when it is installed. From these measurements, the operators may optionally reposition the arms 33 in order to ensure the horizontality of the charging device 10. Such a fine adjustment may be carried out using a small adjustment wheel 51, a threaded rod 52 which enables the distance to be adjusted between the articulated foot 50 and the sliding member 35 on which this foot 50 is mounted.

It is possible to install the lower ring 15, the upper ring 16 and to install the feeder 14 on this upper ring.

After the charging device has been installed and fixed in place in the reactor, the sensor support devices 40 may be mounted. It is possible to make provision for the guiding assemblies 42 and the drive assemblies 43 to be mounted on the fixing plates 41, after the charging device 10 is fixed in place, or prior to being lowered into the reactor, or at a different time.

The sensor support devices 40 may be installed relatively easily by inserting corresponding drive chains 45 in the drive assemblies 43 and the guiding assemblies 42. The length of these drive chains may be adjusted in accordance with the diameter of the reactor, and therefore the bed of catalyst to be monitored, by rotating the drive shaft 431 of the drive assembly 43.

Finally, it is possible to install electrical connections in order to connect each of the sensors to an outer casing, so that the signals originating from these sensors can be read and processed. It is possible, for example, to use electrical wires and means for clip-fitting these electrical wires to the distribution system, in particular along at least a portion of the drive chain, or any other means within the ability of the person skilled in the art.

The invention claimed is:

1. A solid particle distribution system for charging a chamber with solid particles comprising:
   a retention device for a charging device for solid particles, this retention device being arranged so as to ensure the retention of the charging device in the chamber and
   a sensor support device supporting a sensor, the sensor being intended to acquire information relating to the charging of the chamber,
   and wherein
   the solid particle distribution system is arranged so that the retention device and the sensor support device are mounted on the solid particle charging device and the retention device and the sensor support device are able to be moved relative to this charging device,
   the sensor support device is able to have vertical movements, rotation movements and/or radial movements and the retention device is able to have vertical movements, rotation movements and/or radial movements.

2. The distribution system as claimed in claim 1, further comprising:
   a cylindrical support element which is fixedly joined to the charging device and which is arranged so as to support the retention device and the sensor support device so that the retention device and the sensor support device can slide along this support element.

3. The distribution system as claimed in claim 2, wherein the support element comprises a circular ring.

4. The distribution system as claimed in claim 2, further comprising
   a fixing plate which is fixedly joined to the retention device and/or to the sensor support device and which is mounted so as to slide on the support element.

5. The distribution system as claimed in claim 2, further comprising
   means for locking the retention device and/or the sensor support device on the support element.

6. The distribution system as claimed in claim 1, further comprising:
   means for adjusting the height of the retention device with respect to the charging device.

7. The distribution system as claimed in claim 1, wherein the sensor support device comprises a spacer element in order to radially offset the sensor relative to the charging device.

8. The distribution system as claimed in claim 7, wherein the spacer element comprises a drive chain, and
   the sensor support device comprises an element for guiding the drive chain, the guiding element being arranged so as to guide the drive chain so that a portion of the drive chain at an output of the guiding element extends in a direction different from that of a portion of the drive chain at an input of the guiding element.

9. The distribution system as claimed in claim 8, wherein the guiding element defines a passage for receiving the drive chain, the passage forming an angle close to 90°.

10. A method for installing a solid particle distribution system in a chamber, the solid particle distribution system comprising a retention device for a charging device, which retention device is arranged to ensure the retention of the charging device in the chamber, and a sensor support device supporting a sensor, the sensor being intended to acquire information relating to the charging of the chamber, the method comprising:
    a step of assembling the sensor support device and the retention device on the charging device, and a step of adjustment during which the sensor support device and the retention device are moved relative to the charging device in order to be adapted to the environment inside the chamber and/or the diameter of a bed of solid particles which it is desirable to monitor, wherein the sensor support device is able to have vertical movements, rotation movements and/or radial movements and the retention device is able to have vertical movements, rotation movements and/or radial movements.

* * * * *